United States Patent
Chang et al.

(10) Patent No.: US 10,146,344 B2
(45) Date of Patent: Dec. 4, 2018

(54) TOUCH APPARATUS AND TOUCH METHOD

(71) Applicant: Wistron Corporation, New Taipei (TW)

(72) Inventors: Yao-Tsung Chang, New Taipei (TW); Chih-Chung Chiang, New Taipei (TW); Wen-Hua Chang, New Taipei (TW); Meng-Chi Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 41 days.

(21) Appl. No.: 14/833,134

(22) Filed: Aug. 23, 2015

(65) Prior Publication Data

US 2016/0117003 A1   Apr. 28, 2016

(30) Foreign Application Priority Data

Oct. 27, 2014   (TW) ............................. 103137001 A (51) Int. Cl.
*G06F 3/041* (2006.01)

(52) U.S. Cl.
CPC ............ *G06F 3/041* (2013.01); *G06F 3/0416* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0206162 A1* | 11/2003 | Roberts | ................. | G06F 3/0414 345/173 |
| 2009/0201260 A1* | 8/2009 | Lee | ..................... | G06F 3/04883 345/173 |
| 2010/0188353 A1* | 7/2010 | Yoon | ................... | G06F 3/04883 345/173 |
| 2010/0277439 A1* | 11/2010 | Charlier | ................ | G06F 1/1616 345/176 |
| 2011/0122086 A1* | 5/2011 | Chuang | ................... | G06F 3/045 345/174 |
| 2011/0163986 A1* | 7/2011 | Lee | ....................... | G06F 1/1692 345/173 |

(Continued)

FOREIGN PATENT DOCUMENTS

| | | |
|---|---|---|
| CN | 102760009 | 10/2012 |
| CN | 103425361 | 12/2013 |
| WO | 2008030563 | 3/2008 |

*Primary Examiner* — Kwin Xie
*Assistant Examiner* — Sosina Abebe
(74) *Attorney, Agent, or Firm* — JCIPRNET (57) ABSTRACT

A touch apparatus and a touch method are provided. The touch apparatus includes a touch panel and a processing unit. The touch panel includes a plurality of sensing electrodes. The touch panel has a first contact surface and a second contact surface. The processing unit is configured to the touch panel. The processing unit receives a touch signal generated by the touch panel sensing a touch operation. The processing unit determines whether the operation is located on the first contact surface or on the second contact surface of the touch panel according to the touch signal and a preset condition. The preset condition is determined by a sensing signal generated by sensing the touch operation touching first contact surface or the second contact surface of the touch panel using at least one of the sensing electrodes.

18 Claims, 4 Drawing Sheets

(56) References Cited

U.S. PATENT DOCUMENTS

| | | | |
|---|---|---|---|
| 2011/0234523 A1* | 9/2011 | Chang | G06F 3/044 345/173 |
| 2012/0081292 A1* | 4/2012 | Sirpal | G06F 1/1616 345/169 |
| 2012/0110447 A1* | 5/2012 | Chen | G06F 1/1626 715/702 |
| 2013/0249873 A1* | 9/2013 | Zhang | G09G 3/22 345/204 |
| 2013/0265284 A1 | 10/2013 | Yun et al. | |
| 2014/0267099 A1* | 9/2014 | Blair | G06F 3/041 345/173 |
| 2014/0340356 A1* | 11/2014 | Takahashi | G06F 3/0418 345/174 |

* cited by examiner

TOUCH APPARATUS AND TOUCH METHOD

CROSS-REFERENCE TO RELATED APPLICATION

This application claims the priority benefit of Taiwan application serial no. 103137001, filed on Oct. 27, 2014. The entirety of the above-mentioned patent application is hereby incorporated by reference herein and made a part of this specification.

BACKGROUND

Field of the Invention

The invention is directed to a touch technique and more particularly, to an apparatus and a method thereof capable of achieving a double-sided touch control functionality by using only one touch panel.

Description of Related Art

With the development and progress of touch techniques, touch equipment has been playing an essential role in electronic apparatuses, such as notebook computers, mobile phones, tablet PCs, and portable multimedia players. Thanks to the advantages of convenient and intuitive operations, the touch equipment has been deeply favored by customers and has become the mainstream equipment on the market. In order to further expand operational functionalities available in the touch equipment, a double-sided touch concept is proposed.

Figure 1:
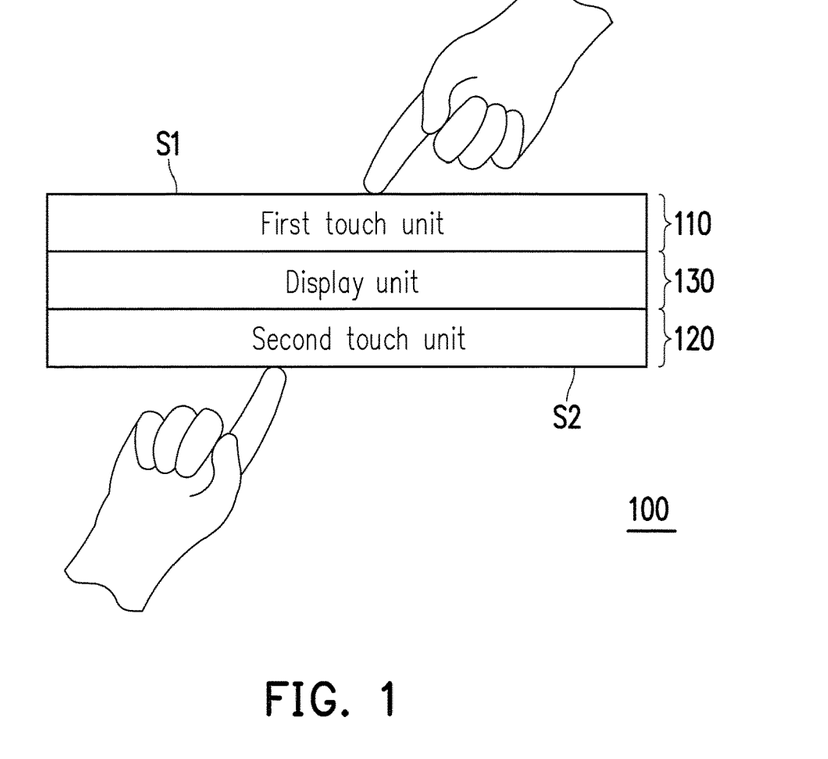
FIG. 1 is a schematic diagram illustrating a touch apparatus.

For example, FIG. 1 is a schematic diagram illustrating a touch apparatus which can provide a double-sided touch control function. With reference to FIG. 1, a touch apparatus 100 includes a first touch unit 110, a second touch unit 120 and a display unit 130, and the first touch unit 110 and the second touch unit 120 are respectively disposed on two sides of the display unit 130, such that touch operations performed on a front surface S1 and a back surface S2 can be independently sensed by the first touch unit 110 and the second touch unit 120, respectively.

Accordingly, in the current technique, the combination of two touch units (i.e., the first touch unit 110 and the second touch unit 120) has to be used for sensing touch operations performed on the front surface S1 and the back surface S2 of the touch apparatus 100. In other words, each of the touch units merely provides each single surface of the touch apparatus 100 with a touch control functionality, which certainly cause a thickness of the touch apparatus 100 to be limited and cannot meet the requirement of low manufacturing cost.

SUMMARY

The invention provides a touch apparatus and a touch method capable of achieving a double-sided touch control functionality by using only one touch panel and having small thickness and low manufacturing cost.

According to an embodiment of the invention, a touch apparatus including a touch panel and a processing unit is provided. The touch panel includes a plurality of sensing electrodes, and the touch panel has a first contact surface and a second contact surface. The processing unit is coupled to the touch panel. The processing unit receives a touch signal generated by the touch panel sensing a touch operation and determines whether the touch operation is located on the first contact surface or on the second contact surface of the touch panel according to the touch signal and a preset condition. The preset condition is determined according to whether a sensing signal is generated by at least one of the sensing electrodes sensing the touch operation be located on the first contact surface or the second contact surface of the touch panel.

According to another embodiment of the invention, a touch method adapted for a touch apparatus including a plurality of sensing electrodes is provided. The touch method includes following steps: sensing a touch operation to generate a touch signal and determining whether the touch operation is located on a first contact surface or a second contact surface of the touch apparatus according to the touch signal and a preset condition. The preset condition is determined according to a sensing signal generated by at least one of the sensing electrodes sensing the touch operation be located on the first contact surface or the second contact surface of the touch panel.

To sum up, in the touch apparatus and the touch method provided by the embodiments of the invention, the touch operation is sensed by using a single touch module and the touch signal generated thereby is compared with the preset condition, and thereby, whether the touch operation is located on the first or the second contact surface of the touch apparatus is determined. In this way, through the use of only one touch module, the double-sided touch control functionality can be achieved, and a design with small thickness and low manufacturing cost can be realized.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The embodiments of the invention provide a touch apparatus and a touch method capable of sensing a touch operation by using a single touch module, so as to determine whether the touch operation is located on a first or a second contact surface of the touch apparatus according to a result of comparing a touch signal generated thereby with a preset condition. Thereby, in the embodiments of the invention, through the use of only one touch module the double-sided touch control functionality and features of having small thickness and low manufacturing cost can be achieved.

Figure 2A:
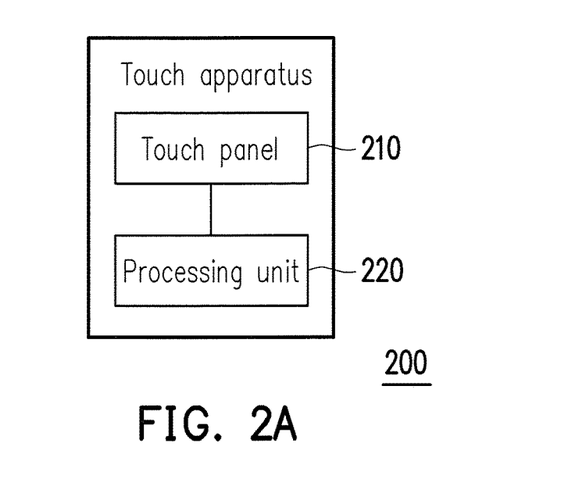
FIG. 2A is a schematic block diagram illustrating a touch apparatus according to an embodiment of the invention.
Figure 2B:
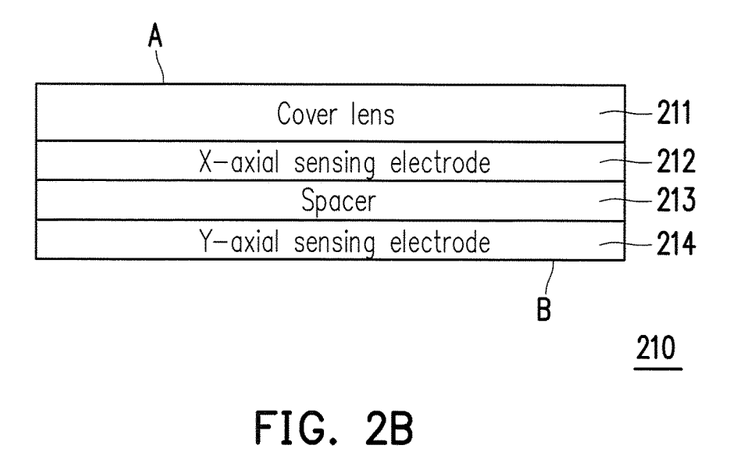
FIG. 2B is a schematic cross-sectional diagram illustrating the touch apparatus according to an embodiment of the invention.

FIG. 2A is a schematic block diagram illustrating a touch apparatus according to an embodiment of the invention, and FIG. 2B is a schematic cross-sectional diagram illustrating the touch apparatus according to an embodiment of the invention. With reference to FIG. 2A and FIG. 2B, a touch apparatus 200 may be, for example, a capacitive, a resistive or an optical touch apparatus, or may be an electronic apparatus (e.g., a mobile phone, a tablet computer or a notebook computer) equipped with a capacitive, a resistive or an optical touch module. The touch apparatus 200 includes a touch panel 210 and a processing unit 220, and functions thereof are described as follows.

The touch panel 210 is, for example, a display with a touch function, such as a liquid crystal display (LCD), an organic electro-luminescent display (OELD) and projection display, and may apply a touch technique, such as a capacitive, a resistive or an optical touch technique. The touch panel 210 may include a plurality of sensing electrodes, which may include, for example, an X-axial sensing electrode and/or a Y-axial sensing electrode. Additionally, the touch panel 210 may have a first contact surface A (e.g., a front surface of the touch panel 210) and a second contact surface B (e.g., a back surface of the touch panel 210).

The processing unit 220 is coupled to the touch panel 210. The processing unit 220 may be a central processing unit (CPU) or any other any other programmable microprocessor, digital signal processor (DSP), programmable controller, application specific integrated circuit (ASIC), any other similar device, or a combination of these devices utilized for general or specific application. In the present embodiment, the processing unit 220 is configured to determine whether a sensed touch operation is located on the first contact surface A or the second contact surface B of the touch apparatus 200, so as to provide a double-sided touch control function.

The touch panel 210 is further described with reference to the schematic diagram of FIG. 2B. The touch panel 210 is, for example, a touch panel applying the capacitive touch technique, and may include a cover lens 211, an X-axial sensing electrode 212, a spacer 213 and a Y-axial sensing electrode 214, where each layer may be bonded together by means of a disposing or adhering technique. In the present embodiment, the cover lens 211 is disposed above the X-axial sensing electrode 212, and the spacer 213 is disposed between the X-axial sensing electrode 212 and the Y-axial sensing electrode 214. Thus, as shown in FIG. 2B, the touch panel 210 may provide the first contact surface A through the cover lens 211 and provide the second contact surface B through the Y-axial sensing electrode 214. Therein, the cover lens 211 is made of, for example, a glass material and may have characteristics, such as being rigid and scratch-resistive. The spacer 213 is made of, for example, a glass or a thin-film material, and may serve to support the X-axial sensing electrode 212 and the Y-axial sensing electrode 214 and isolate the X-axial sensing electrode 212 from the Y-axial sensing electrode 214, such that when a user performs the touch operation on the touch panel 210, the X-axial sensing electrode 212 and the Y-axial sensing electrode 214 do not contact each other.

The X-axial sensing electrode 212 and the Y-axial sensing electrode 214 may be, for example, conductive plates formed by a conductive material, such as transparent indium tin oxide (ITO) or metal meshes, and configured to sense capacitance variation occurs when the user touches the first contact surface A or the second contact surface B by, for example, a figure or when the user's figure or other part of body is located on the first contact surface A or the second contact surface B. Thus, the processing unit 220 may analyze a touched position of the touch operation on the touch panel 210 according to the capacitance variation sensed by the X-axial sensing electrode 212 and/or the Y-axial sensing electrode 214.

It should be noted that the cover lens 211, the X-axial sensing electrode 212, the spacer 213 and the Y-axial sensing electrode 214 form a touch module of the touch apparatus 200. Namely, by means of this single one touch module, the touch apparatus 200 of the present embodiment may sense whether the touch operation is located on the first contact surface A or the second contact surface B, so as to provide a double-sided touch control function.

Figure 3:
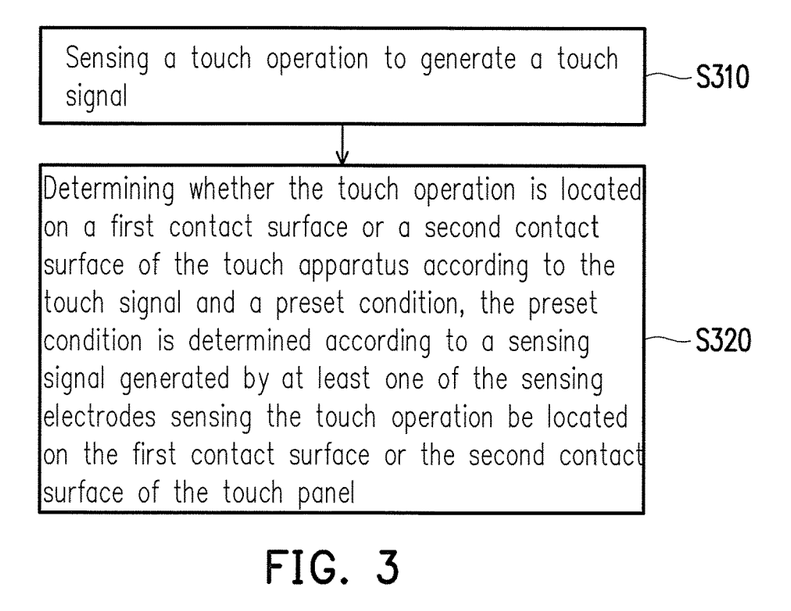
FIG. 3 is a flowchart illustrating a touch method according to an embodiment of the invention.

Based on the aforementioned apparatus structure, an embodiment is provided to describe a touch method of the invention in detail. With reference to FIG. 3, FIG. 3 is a flowchart illustrating a touch method according to an embodiment of the invention and adapted for the touch apparatus 200 illustrated in FIG. 2A and FIG. 2B. Each step of the method will be described with reference to each element of the touch apparatus 200 illustrated in FIG. 2A and FIG. 2B.

In step S310, the touch panel 210 senses a touch operation to generate a touch signal. To be specific, in the present embodiment, the touch panel 210 may senses the touch operation through at least one of the X-axial sensing electrode 212 and the Y-axial sensing electrode 214, so as to generate the touch signal according to mutual capacitance, self-capacitance or a signal-to-noise ratio (SNR) corresponding to the touch operation.

In step S320, the processing unit 220 determines whether the touch operation is located on the first contact surface A or the second contact surface B of the touch apparatus 200 according to the touch signal and a preset condition. The preset condition may be determined according to whether a sensing signal is generated by at least one of the X-axial sensing electrode 212 and the Y-axial sensing electrode 214 sensing the touch operation contacting the first contact surface A or the second contact surface B of the touch panel 210. In an embodiment, at least one of the sensing electrodes may sense that the touch operation contacts the first contact surface A of the touch panel 210 to generate the sensing signal having a first signal intensity and may sense that the touch operation contacts the second contact surface B of the touch panel 210 to generate the sensing signal having a second signal intensity. Additionally, the preset condition is, for example, a threshold, and the threshold may be determined by the first signal intensity and the second signal intensity. Thus, the processing unit 220 may compare a third signal intensity of the touch signal with the threshold, and when the third signal intensity is higher than the threshold, the processing unit 220 may determine that the touch operation is located on one of the first contact surface A and the second contact surface B of the ouch panel 210, while when the third signal intensity is lower than the threshold, the processing unit 220 may determine that touch operation is located on the other one of the first contact surface A and the second contact surface B of the ouch panel 210.

In an embodiment, the threshold may be set, for example, within an intensity range, which will be described by using an example illustrated in FIG. 4 and with reference to each element of the touch apparatus 200 illustrated in FIG. 2A and FIG. 2B.

Figure 4:
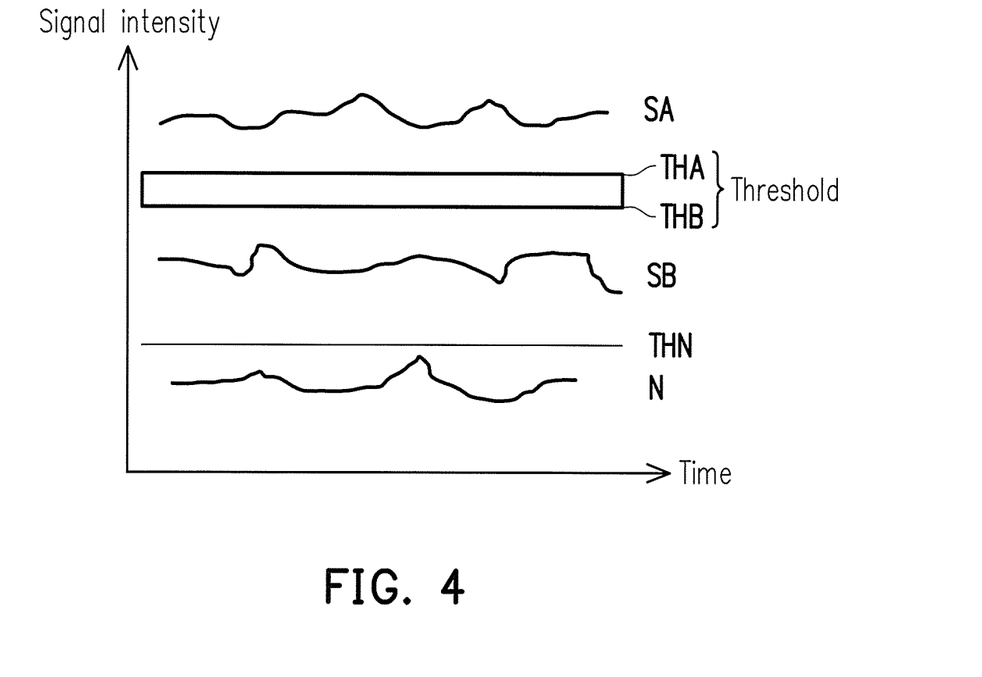
FIG. 4 illustrates an example of the signal intensity according to an embodiment of the invention.

With reference to FIG. 4, FIG. 4 illustrates an example of the signal intensity according to an embodiment of the invention, where a curve SA, a curve SB and a curve N may be used to indicate experimental data obtained through multiple times of measurements. In the present embodiment, a self-capacitance sensing touch technique is utilized. Namely, in the present embodiment, the touch operation is sensed by using only the X-axial sensing electrode 212 to generate the sensing signal according to capacitance variation caused by the touch operation to self-capacitance of the X-axial sensing electrode 212. Thus, the X-axial sensing electrode 212 may contact the first contact surface A of the touch panel 210 according to the touch operation to generate the sensing signal having the first signal intensity (indicated by the curve SA) and may contact the second contact surface B of the touch panel 210 according to the touch operation to generate the sensing signal having the second signal intensity (indicated by the curve SA). Therein, the first signal intensity is greater than the second signal intensity.

On the other hand, the curve N indicates a signal intensity of the sensing signal generated by the X-axial sensing electrode 212 when no touch operation is sensed. In the present embodiment, a noise threshold THN may be set according to the signal intensity corresponding to the curve N, where the noise threshold THN is used to determine whether the touch operation is received by the touch panel 210, and the touch apparatus is considered as receiving the touch operation only when the intensity of the sensing signal generated by the X-axial sensing electrode 212 is greater than the noise threshold THN.

It should be noted that in the present embodiment, thresholds THA and THB may be set based on the assumption of the first signal intensity corresponding to the curve SA being greater than the second signal intensity corresponding to the curve SB to obtain an intensity range which is used as the threshold. Then, when the X-axial sensing electrode 212 senses the touch operation and correspondingly generates the touch signal, the processing unit 220 may determine the touch operation as being located on the first contact surface A of the touch panel 210 according to the third signal intensity of the touch signal being higher than the threshold, and determine that touch operation as being located on the second contact surface B of the touch panel 210 according to the third signal intensity of the touch signal being lower than threshold. In this way, the touch apparatus 200 can achieve the double-sided touch control functionality through the single touch module of the touch panel 210.

According to another aspect, the processing unit 220 may set the preset condition of FIG. 4 as the first signal intensity corresponding to the curve SA being greater than the second signal intensity corresponding to the curve SB in an embodiment, and when the touch operation is sensed by the X-axial sensing electrode 212 to correspondingly generate the touch signal, the processing unit 220 may compare the third signal intensity of the touch signal with the first signal intensity and compare the third signal intensity of the touch signal with the second signal intensity. Thus, when the third signal intensity matches with the first signal intensity corresponding to the curve SA, the processing unit 220 may determine the touch operation as being located on the first contact surface A of the touch panel 210, while when the third signal intensity matches with the second signal intensity corresponding to the curve SB, the processing unit 220 may determine the touch operation as being located on the second contact surface B of the touch panel 210. For example, the processing unit 220 determines whether a difference between the third signal intensity and the first signal intensity (or the second signal intensity) falls within a preset range (e.g., 10% of the first signal intensity or 10% of the second signal intensity), so as to determine whether the third signal intensity of the touch signal matches with the first signal intensity or the second signal intensity.

It should be noted that the signal intensity of the sensing signal is influenced by a thickness and a material between each sensing electrode and its contacting surface. Thus, in some embodiments, after the curve SA and the curve SB of the sensing signal are obtained, a material and a thickness of the cover lens 211 or a parameter of each of the other structure layers, for example, may be further adjusted, such that the difference between the first signal intensity corresponding to the curve SA and the second signal intensity corresponding to the curve SB may be larger to improve the degree of accuracy of sensing the touch operation on both surfaces.

In the embodiment above, the sensing signal is generated according to the capacitance variation caused by the touch operation caused to the self-capacitance on the X-axial sensing electrode 212. In other embodiments, the sensing signal may also be generated according to the capacitance variation caused by the touch operation to the self-capacitance on the Y-axial sensing electrode 214, whose implement thereof is similar to the aforementioned embodiment and will not be repeated.

It is to be mentioned that in the self-capacitance sensing touch apparatus 200, the X-axial sensing electrode 212 and the Y-axial sensing electrode 214 respectively sense the touch operation by means of a self-capacitance coupling capacitor, and thus, when the touch operation is located on the first contact surface A in the embodiment illustrated in FIG. 2, the X-axial sensing electrode 212 senses the touch operation, and the signal intensity of the touch signal correspondingly generated thereby is greater than the signal intensity of the touch signal generated by the Y-axial sensing electrode 214. Thus, in an embodiment, the touch operation may also be sensed respectively by the X-axial sensing electrode 212 and the Y-axial sensing electrode 214, and the processing unit 220 compares the touch signal generated by the X-axial sensing electrode 212 with the touch signal generated by the Y-axial sensing electrode 214 sensing the touch operation to determine which surface of the touch panel 210 the touch operation is located on.

Additionally, in some embodiments, the processing unit 220 may further process a first sensing signal SA and a second sensing signal SB generated by the X-axial sensing electrode 212 and deduct affection caused by noise N to the sensing signals, such that the signal intensity sensed by the X-axial sensing electrode 212 may be more accurate.

In the embodiment above, the self-capacitance sensing technique is utilized to describe the touch apparatus; however, persons who would like to apply the present embodiment may apply the determination similarly in a touch signal utilizing a mutual-capacitance sensing technique based on her/his demands, or alternatively, further determine which surface of the touch apparatus 200 the touch operation contacts by using a SNR of the touch signal after the touch signal corresponding to the capacitance variation is obtained.

Specifically, in an embodiment, if the touch apparatus 200 utilizes the mutual-capacitance sensing technique, the touch apparatus 200 may sense the touch operation through the X-axial sensing electrode 212 and the Y-axial sensing electrode 214, so as to generate the sensing signal according to capacitance variation caused by the touch operation to mutual capacitance between the X-axial sensing electrode 212 and the Y-axial sensing electrode 214. Therein, the X-axial sensing electrode 212 and the Y-axial sensing electrode 214 may generate the sensing signal having the first signal intensity according to the touch operation contacting the first contact surface A of the touch panel 210, and generate the sensing signal having the second signal intensity according to the touch operation contacting the second contact surface B of the touch panel 210. In the apparatus structure of the present embodiment, it is considered that a material and a thickness of the cover lens 211 may influence the X-axial sensing electrode 212 and the Y-axial sensing electrode 214 on sensing the touch operation contacting the first contact surface A and lead to a relatively weak sensed capacitance variation. Therefore, if the aforementioned first signal intensity and second signal intensity are determined by the capacitance variation, in the present embodiment, the first signal intensity may be less than the second signal intensity, for example.

Additionally, as for the scenario where the SNR serves as the preset condition, in an embodiment, the touch apparatus 200 may sense the touch operation through at least one of the X-axial sensing electrode 212 and the Y-axial sensing electrode 214 to obtain a sensing result, and the processing unit 220 may analyze the sensing result to calculate a ratio of the sensing signal to noise, such that an SNR corresponding to the touch operation is obtained for determining the preset condition. The sensing result may correspond to different capacitance variations according to whether the touch apparatus 200 utilizes the self-capacitance sensing technique or the mutual-capacitance sensing technique. As for the manner for determining the preset condition, taking the self-capacitance sensing technique of the embodiment illustrated in FIG. 4 as an example, the processing unit 220 may calculate a ratio of an average signal intensity of the curve SA to an average signal intensity of the curve N to obtain an SNR of the first signal intensity and calculate a ratio of an average signal intensity of the curve SB to an average signal intensity of the curve N to obtain an SNR of the second signal intensity. In this way, through comparing the SNR of the first signal intensity with an SNR of the third signal intensity of the touch signal, and comparing the SNR of the second signal intensity with the SNR of the third signal intensity, whether the touch operation is located on the first contact surface A or the second contact surface B may be determined. Persons who would like to apply the present embodiment may determine the preset condition for double-sided touch sensing according to her/his design requirements, and the invention is not intent to limit the determination manner of the preset condition.

Figure 5:
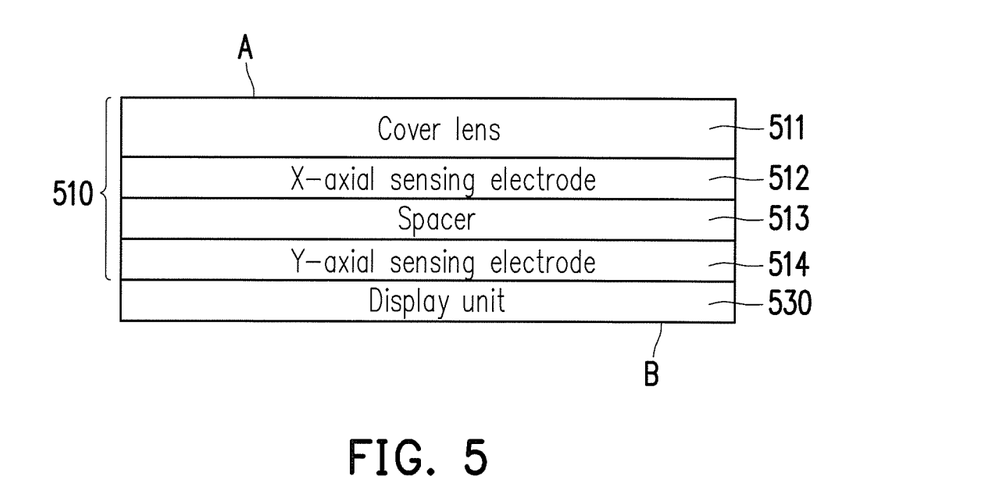
FIG. 5 illustrates an example of the touch panel according to an embodiment of the invention.

It is to be mentioned that in the embodiments above, the touch apparatus 200 can achieve the double-sided touch sensing functionality by using only one touch module of the touch panel 210. In other embodiment, the touch apparatus 200 may further include a display unit. FIG. 5 illustrates an example where a display unit 530 is disposed below a Y-axial sensing electrode 514, i.e., a touch panel 510 is superimposed on the display unit 530. Therein, a back surface of the display unit 530 (i.e., a surface which does not contact the touch panel 510) may provide the second contact surface B of the touch apparatus 200. With such structure, the double-sided touch sensing functionality of the touch apparatus 200 may be achieved similarly to the method described above, and the processing unit 220 may further control the display unit 530 to execute a corresponding function according to the touch operation in the present embodiment. As for a cover lens 511, an X-axial sensing electrode 512, a spacer 513 and a Y-axial sensing electrode 514 included in the touch panel 510, they are respectively similar to the cover lens 211, the X-axial sensing electrode 212, the spacer 213 and the Y-axial sensing electrode 214 of the embodiment illustrated in FIG. 2B and thus, may refer to the description related the embodiments above for detailed technical content thereof.

It should be noted that a thickness and a material of the display unit 530 may also influence the sensing signal having the second signal intensity which is generated on the second contact surface B and correspondingly determine the preset condition for the processing unit 220 on determining which contact surface the touch operation is located. In an embodiment, the touch signal and the sensing signal may be generated by the X-axial sensing electrode 512 or the Y-axial sensing electrode 514 according to the thicknesses and the materials of the cover lens 511 and the display unit 530. In this way, the processing unit 220 may determine the preset condition according to the first signal intensity and the second signal intensity of the sensing signal and determine whether the touch operation is located on the first contact surface A or the second contact surface B through respectively comparing the first and the second signal intensity of the sensing signal with the third signal intensity of the touch signal.

Moreover, under the consideration that the touch signal generated by the touch panel 210 sensing the touch operation may vary with a user continuously approaching the touch panel 210, in an embodiment, the processing unit 220 may further analyze whether the touch signal is a valid signal, so as to avoid erroneous determination due to the sensing signal being prematurely determined, which will be described through an embodiment illustrated in FIG. 6 with reference to each element illustrated in FIG. 2A and FIG. 2B.

Figure 6:
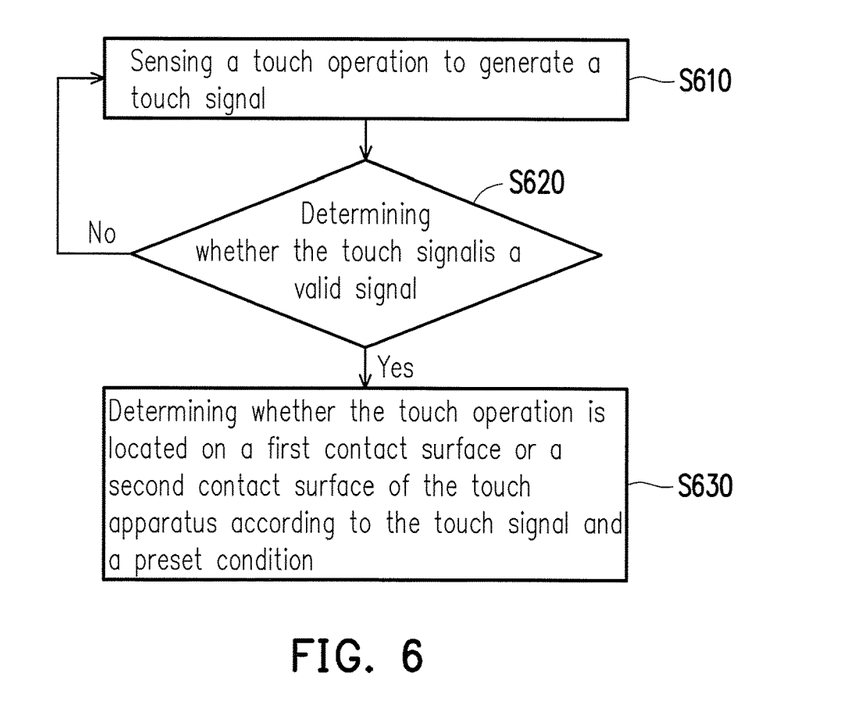
FIG. 6 is a flowchart illustrating a touch method according to an embodiment of the invention.

FIG. 6 is a flowchart illustrating a touch method according to an embodiment of the invention. With reference to FIG. 6, in step S610, the touch panel 210 senses a touch operation to generate a touch signal. In step S620, the processing unit 220 determines whether the touch signal is a valid signal. In detail, the processing unit 220 may determine, within a set period, whether the touch signal is valid according to whether intensity variation of the touch signal generated by the touch operation is less than a tolerable range. In other words, the processing unit 220 determines whether the signal intensity of the touch signal tends to be stabilized by using the tolerable range, and the intensity variation of the touch signal is less than the tolerable range, the signal intensity of the touch signal is determined as stable, and the signal intensity is used for the determination procedure in later double-sided touch control operation.

Then, in step S630, the processing unit 220 determines whether the touch operation is located on the first contact surface A or the second contact surface B of the touch apparatus 200 according to the touch signal and a preset condition. This step is similar to step S320 in the embodiment above and thus, may refer the description related to the embodiment above for the details thereof. Thereby, in the present embodiment, whether the touch signal is a valid signal is further determined, such that determination accuracy of the double-sided touch control functionality can be improved.

Figure 7:
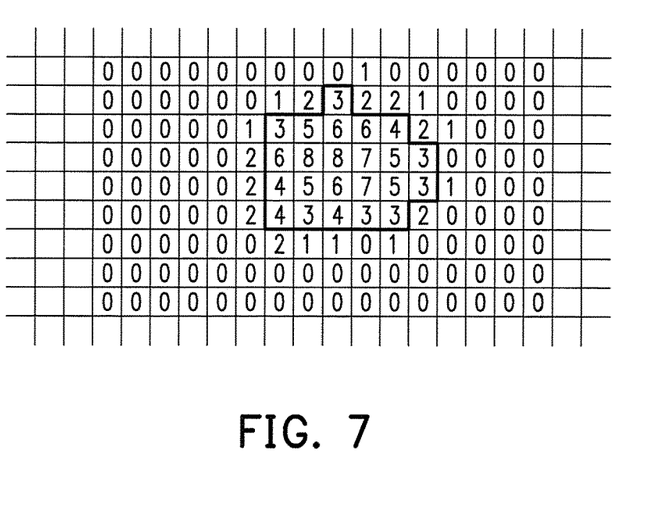
FIG. 7 illustrates an example of the touch signal according to an embodiment of the invention.

Furthermore, it is to be mentioned that in some embodiments, different conditions for the determination in the double-sided touch control operation may be set according to a touch area touched by the user while operating the touch apparatus 200. For example, FIG. 7 illustrates an example of the touch signal according to an embodiment of the invention, in which each number corresponds to a signal intensity of the touch signal on each sensing point in the touch panel

210. In the present embodiment, a touch signal having a signal intensity greater than 2 is considered as valid, and a touch area of the touch operation while the touch apparatus 200 is operated is correspondingly obtained. Thus, the processing unit 220 may set the preset condition for performing the determination in the double-sided touch control operation and use an average of the signal intensity on each sensing point as the signal intensity of the touch signal, so as to determine whether the touch operation is located on the first contact surface A or the second contact surface B of the touch panel 220. Thus, it may also be considered in the present embodiment that the determination in the double-sided touch control operation may also be performed according to different touch areas, such that the double-sided touch control functionality provided by the touch apparatus 200 may be applied more widely.

To sum up, in the touch apparatus and the touch method provided by the embodiments of the invention, the touch operation can be sensed by using only one touch module, and the generated touch signal is compared with the preset condition, so as to determine which contact surface of the touch apparatus the touch operation is located on. In this way, the effect of double-sided touch sensing through one single touch module and the advantage of small thickness and low manufacturing cost can be achieved. In the embodiments of the invention, the preset condition can be adaptively designed according to, for example, the material and the thickness of the touch panel, and whether the touch signal is valid can be determined by means of setting the threshold or further according to the touch area, such that the determination result of the double-sided touch operation can be more accurate.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch apparatus, comprising:
    a touch panel, comprising a plurality of sensing electrodes and having a front contact surface and a rear contact surface, wherein the sensing electrodes only comprise a first sensing electrode and a second sensing electrode, the first sensing electrode is closer to the front contact surface than the second sensing electrode, and the second sensing electrode is closer to the rear contact surface than the first sensing electrode; and
    a processing unit, coupled to the touch panel, receiving a touch signal generated by the touch panel sensing a touch operation and determining whether the touch operation is located on the front contact surface or on the rear contact surface of the touch panel according to the touch signal and a preset condition, wherein
    the preset condition is determined according to whether a sensing signal is generated by at least one of the sensing electrodes sensing the touch operation being located on the front contact surface and the rear contact surface of the touch panel, wherein
    the preset condition is set as a first signal intensity of the sensing signal being greater than a second signal intensity of the sensing signal, and the processing unit compares a third signal intensity of the touch signal with the first signal intensity, and compares the third signal intensity with the second signal intensity, when the third signal intensity matches with the first signal intensity, the processing unit determines the touch operation as being located on one of the front contact surface and the rear contact surface of the touch panel, and when the third signal intensity matches with the second signal intensity, the processing unit determines the touch operation as being located on the other one of the front contact surface and the rear contact surface of the touch panel.

2. The touch apparatus according to claim 1, wherein the sensing electrodes comprise an X-axial sensing electrode and a Y-axial sensing electrode, and the touch panel further comprises:
    a cover lens, disposed above the X-axial sensing electrode and provides the front contact surface of the touch panel; and
    a spacer, disposed between the X-axial sensing electrode and the Y-axial sensing electrode, wherein
    the Y-axial sensing electrode provides the rear contact surface of the touch panel, the X-axis is not parallel to the Y-axis, the X-axial sensing electrode is closer to the front contact surface than the Y-axial sensing electrode, and the Y-axial sensing electrode is closer to the rear contact surface than the X-axial sensing electrode.

3. The touch apparatus according to claim 2, wherein the touch apparatus senses the touch operation only through one of the X-axial sensing electrode and the Y-axial sensing electrode, so as to generate the sensing signal according to capacitance variation caused by the touch operation to self-capacitance on the sensing electrode.

4. The touch apparatus according to claim 3, wherein the touch apparatus senses the touch operation only through the X-axial sensing electrode, the X-axial sensing electrode contacts the front contact surface of the touch panel according to the touch operation to generate the sensing signal having a first signal intensity and contacts the rear contact surface of the touch panel according to the touch operation to generate the sensing signal having a second signal intensity, wherein the first signal intensity is greater than the second signal intensity.

5. The touch apparatus according to claim 2, wherein the touch apparatus senses the touch operation through the X-axial sensing electrode and the Y-axial sensing electrode, so as to generate the sensing signal according to capacitance variation caused by the touch operation to mutual capacitance between the X-axial sensing electrode and the Y-axial sensing electrode.

6. The touch apparatus according to claim 5, wherein the X-axial sensing electrode and the Y-axial sensing electrode contact the front contact surface of the touch panel according to the touch operation to generate the sensing signal having a first signal intensity, and the X-axial sensing electrode and the Y-axial sensing electrode contact the rear contact surface of the touch panel according to the touch operation to generate the sensing signal having a second signal intensity, wherein the first signal intensity is less than the second signal intensity.

7. The touch apparatus according to claim 2, wherein the touch apparatus senses the touch operation through at least one of the X-axial sensing electrode and the Y-axial sensing electrode to obtain a sensing result, and the processing unit analyzes the sensing result to calculate a ratio of the sensing signal to noise, so as to obtain a signal-to-noise ratio (SNR) corresponding to the touch operation to determine the preset condition.

8. The touch apparatus according to claim 2, wherein the touch apparatus further comprises:

a display unit, disposed below the Y-axial sensing electrode to provide the rear contact surface of the touch panel, wherein
the sensing electrodes generate the touch signal and the sensing signal according to thicknesses and materials of the cover lens and the display unit.

9. A touch method, adapted for a touch apparatus comprising a plurality of sensing electrodes, the touch method comprising:
sensing a touch operation to generate a touch signal; and
determining whether the touch operation is located on a front contact surface or a rear contact surface of the touch apparatus according to the touch signal and a preset condition, wherein the preset condition is determined according to a sensing signal generated by at least one of the sensing electrodes sensing the touch operation being located on the front contact surface and the rear contact surface of the touch panel, and the sensing electrodes only comprise a first sensing electrode and a second sensing electrode, the first sensing electrode is closer to the front contact surface than the second sensing electrode, and the second sensing electrode is closer to the rear contact surface than the first sensing electrode, wherein
the preset condition is set as a first signal intensity of the sensing signal being greater than a second signal intensity of the sensing signal, and the step of determining whether the touch operation is located on the front contact surface or the rear contact surface of the touch apparatus comprises:
comparing a third signal intensity of the touch signal with the first signal intensity, and comparing the third signal intensity with the second signal intensity;
when the third signal intensity matches with the first signal intensity, determining the touch operation as being located on one of the front contact surface and the rear contact surface of the touch panel; and
when the third signal intensity matches with the second signal intensity, determining the touch operation as being located on the other one of the front contact surface and the rear contact surface of the touch panel.

10. The touch method according to claim 9, wherein the touch apparatus comprises an X-axial sensing electrode, a Y-axial sensing electrode, a cover lens and a spacer, the cover lens is disposed above the X-axial sensing electrode, the spacer is disposed between the X-axial sensing electrode and the Y-axial sensing electrode, and touch method further comprises:
providing the front contact surface of the touch apparatus through the cover lens; and
providing the rear contact surface of the touch apparatus through the Y-axial sensing electrode,
wherein the X-axis is not parallel to the Y-axis, the X-axial sensing electrode is closer to the front contact surface than the Y-axial sensing electrode, and the Y-axial sensing electrode is closer to the rear contact surface than the X-axial sensing electrode.

11. The touch method according to claim 10, wherein the touch apparatus senses the touch operation only through one of the X-axial sensing electrode and the Y-axial sensing electrode, so as to generate the sensing signal according to capacitance variation caused by the touch operation to self-capacitance on the sensing electrode.

12. The touch method according to claim 11, wherein the touch apparatus senses the touch operation only through the X-axial sensing electrode, the X-axial sensing electrode contacts the front contact surface of the touch panel according to the touch operation and contacts the rear contact surface of the touch panel according to the touch operation to generate the sensing signal having a second signal intensity, wherein the first signal intensity is greater than the second signal intensity.

13. The touch method according to claim 10, wherein the touch apparatus senses the touch operation through the X-axial sensing electrode and the Y-axial sensing electrode, so as to generate the sensing signal according to capacitance variation caused by the touch operation to mutual capacitance between the X-axial sensing electrode and the Y-axial sensing electrode.

14. The touch method according to claim 13, wherein the X-axial sensing electrode and the Y-axial sensing electrode contact the front contact surface of the touch panel according to the touch operation to generate the sensing signal having a first signal intensity, and the X-axial sensing electrode and the Y-axial sensing electrode contact the rear contact surface of the touch panel according to the touch operation to generate the sensing signal having a second signal intensity, wherein the first signal intensity is less than the second signal intensity.

15. The touch method according to claim 10, wherein
the touch apparatus senses the touch operation through at least one of the X-axial sensing electrode and the Y-axial sensing electrode to obtain a sensing result, and the touch method further comprises:
analyzing the sensing result to calculate a ratio of the sensing signal to noise, so as to obtain a signal-to-noise ratio (SNR) corresponding to the touch operation to detennine the preset condition.

16. The touch method according to claim 10, wherein the touch apparatus further comprises a display unit disposed below the Y-axial sensing electrode, and the touch method comprises:
providing the rear contact surface of the touch apparatus through the display unit, wherein
the sensing electrodes generate the touch signal and the sensing signal according to thicknesses and materials of the cover lens and the display unit.

17. A touch apparatus, co p sing:
a touch panel, comprising a plurality of sensing electrodes and having a front contact surface and a rear contact surface, wherein the sensing electrodes only comprise a first sensing electrode and a second sensing electrode, the first sensing electrode is closer to the front contact surface than the second sensing electrode, and the second sensing electrode is closer to the rear contact surface than the first sensing electrode; and
a processing unit, coupled to the touch panel, receiving a touch signal generated by the touch panel sensing a touch operation and determining whether the touch operation is located on the front contact surface or on the rear contact surface of the touch panel according to the touch signal and a preset condition, wherein
the preset condition is determined according to whether a sensing signal is generated by at least one of the sensing electrodes sensing the touch operation being located on the front contact surface and the rear contact surface of the touch panel, wherein
at least one of the sensing electrodes senses the touch operation touching the front contact surface of the touch panel to generate the sensing signal having a first signal intensity and senses the touch operation touching the rear contact surface of the touch panel to generate the sensing signal having a second signal intensity, and the preset condition is a threshold determined by the first signal intensity and the second signal intensity, when a third signal intensity of the touch signal is higher than the threshold, the processing unit determines the touch operation as being located on one of the front contact surface and the rear contact surface of the touch panel, and when the third signal intensity is lower than the threshold, the processing unit determines the touch operation as being located on the other one of the front contact surface and the rear contact surface of the touch panel.

18. A touch method, adapted for a touch apparatus comprising a plurality of sensing electrodes, the touch method comprising:

sensing a touch operation to generate a touch signal; and determining whether the touch operation is located on a front contact surface or a rear contact surface of the touch apparatus according to the touch signal and a preset condition, wherein the preset condition is determined according to a sensing signal generated by at least one of the sensing electrodes sensing the touch operation being located on the front contact surface and the rear contact surface of the touch panel, and the sensing electrodes only comprise a first sensing electrode and a second sensing electrode, the first sensing electrode is closer to the front contact surface than the second sensing electrode, and the second sensing electrode is closer to the rear contact surface than the first sensing electrode, wherein at least one of the sensing electrodes senses the touch operation touching the front contact surface of the touch panel to generate the sensing signal having a first signal intensity and senses the touch operation touching the rear contact surface of the touch panel to generate the sensing signal having a second signal intensity, the preset condition is a threshold determined by the first signal intensity and the second signal intensity, and the step of determining whether the touch operation is located on the front contact surface or the rear contact surface of the touch apparatus comprises:

when a third signal intensity of the touch signal is higher than the threshold, determining the touch operation as being located on one of the front contact surface and the rear contact surface of the touch panel; and when the third signal intensity is lower than the threshold, determining the touch operation the touch operation as being located on the other one of the front contact surface and the rear contact surface of the touch panel.

* * * * *